United States Patent
Xue et al.

(10) Patent No.: US 10,588,109 B2
(45) Date of Patent: Mar. 10, 2020

(54) POSITIONING BASE STATION DETERMINING METHOD, POSITIONING SERVER, SERVING BASE STATION, AND NETWORK SYSTEM

(71) Applicant: Huawei Technologies Co., Ltd., Shenzhen (CN)

(72) Inventors: Jiantao Xue, Beijing (CN); Houping Ren, Shanghai (CN); Anjian Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/227,900

(22) Filed: Dec. 20, 2018

(65) Prior Publication Data
US 2019/0132816 A1 May 2, 2019

Related U.S. Application Data

(63) Continuation of application No. PCT/CN2016/086728, filed on Jun. 22, 2016.

(51) Int. Cl.
*H04W 24/00* (2009.01)
*H04W 64/00* (2009.01)
(Continued)

(52) U.S. Cl.
CPC .......... *H04W 64/003* (2013.01); *H04W 8/14* (2013.01); *H04W 48/16* (2013.01); *H04W 48/20* (2013.01); *H04W 64/00* (2013.01)

(58) Field of Classification Search
CPC ..... H04W 64/003; H04W 8/14; H04W 48/16; H04W 48/20; H04W 64/00
(Continued)

(56) References Cited

U.S. PATENT DOCUMENTS 6,493,380 B1* 12/2002 Wu ........................... G01S 5/02
342/417
8,989,772 B2* 3/2015 Krauss .................... G01S 19/22
455/456.1
(Continued)

FOREIGN PATENT DOCUMENTS

CN 103002571 A 3/2013
CN 103024757 A 4/2013
(Continued)

OTHER PUBLICATIONS

3rd Generation Partnership Project; Technical Specification Group Radio Access Network; Evolved Universal Terrestrial Radio Access (E-UTRA); LTE Positioning Protocol A (LPPa) (Release 13), 3GPP TS 36.455 V13.1.0 (Mar. 2016), 61 pages.
(Continued)

*Primary Examiner* — Marceau Milord
(74) *Attorney, Agent, or Firm* — Slater Matsil, LLP

(57) ABSTRACT

The present disclosure relates to the mobile communications field. In a positioning base station determining method, a positioning server receives a positioning request message from a terminal device; the positioning server obtains information about a candidate base station from a serving base station of the terminal device according to the positioning request message, where the information about a candidate base station indicates at least one base station; and the positioning server determines a positioning base station set according to the information about a candidate base station, where the positioning base station set includes a positioning base station configured to position the terminal device, and the positioning base station includes one or more of the at least one base station and/or the serving base station.

18 Claims, 4 Drawing Sheets

(51) Int. Cl.
*H04W 8/14* (2009.01)
*H04W 48/16* (2009.01)
*H04W 48/20* (2009.01)

(58) Field of Classification Search
USPC ............... 455/456.1, 404.2, 456.2, 524, 525
See application file for complete search history.

(56) References Cited

U.S. PATENT DOCUMENTS

| | | | | |
|---|---|---|---|---|
| 10,303,408 | B2* | 5/2019 | Chai | G06F 3/1206 |
| 2009/0011775 | A1* | 1/2009 | Niemenmaa | G01S 5/0036 |
| | | | | 455/456.1 |
| 2009/0258658 | A1* | 10/2009 | Edge | G01S 5/0252 |
| | | | | 455/456.3 |
| 2010/0164781 | A1* | 7/2010 | Boyer | G01S 5/0278 |
| | | | | 342/165 |
| 2011/0201332 | A1 | 8/2011 | Siomina et al. | |
| 2011/0205122 | A1* | 8/2011 | Siomina | G01S 5/0221 |
| | | | | 342/387 |
| 2011/0207450 | A1* | 8/2011 | Siomina | G01S 5/0221 |
| | | | | 455/422.1 |
| 2012/0015667 | A1* | 1/2012 | Woo | G01S 5/0221 |
| | | | | 455/456.1 |
| 2012/0129551 | A1* | 5/2012 | Islam | G01S 5/0205 |
| | | | | 455/456.1 |
| 2012/0165012 | A1* | 6/2012 | Fischer | G01S 5/0242 |
| | | | | 455/435.1 |
| 2012/0179660 | A1 | 7/2012 | Sheynblat | |
| 2012/0276916 | A1* | 11/2012 | Kazmi | G01S 5/0205 |
| | | | | 455/452.1 |
| 2012/0295623 | A1* | 11/2012 | Siomina | G01S 5/0263 |
| | | | | 455/436 |
| 2013/0033999 | A1* | 2/2013 | Siomina | G01S 5/0236 |
| | | | | 370/252 |
| 2013/0271324 | A1* | 10/2013 | Sendonaris | G01S 5/02 |
| | | | | 342/450 |
| 2013/0321210 | A1* | 12/2013 | Werner | G01S 5/0236 |
| | | | | 342/451 |
| 2013/0324163 | A1* | 12/2013 | Werner | G01S 5/0252 |
| | | | | 455/456.6 |
| 2014/0066094 | A1* | 3/2014 | Siomina | H04W 64/00 |
| | | | | 455/456.2 |
| 2014/0073356 | A1* | 3/2014 | Siomina | H04W 4/029 |
| | | | | 455/456.2 |
| 2014/0078973 | A1* | 3/2014 | Kazmi | H04W 8/22 |
| | | | | 370/329 |
| 2014/0099970 | A1* | 4/2014 | Siomina | G01S 19/49 |
| | | | | 455/456.1 |
| 2014/0349677 | A1* | 11/2014 | Xiao | H04W 64/00 |
| | | | | 455/456.1 |
| 2015/0223085 | A1* | 8/2015 | Siomina | H04W 52/0206 |
| | | | | 370/252 |
| 2016/0066174 | A1 | 3/2016 | Kim et al. | |
| 2017/0059689 | A1* | 3/2017 | Edge | G01S 5/0289 |
| 2017/0288897 | A1* | 10/2017 | You | G01S 5/02 |
| 2018/0139578 | A1 | 5/2018 | Xiao et al. | |
| 2019/0049550 | A1* | 2/2019 | Modarres Razavi | |
| | | | | G01S 5/0036 |

FOREIGN PATENT DOCUMENTS

| | | |
|---|---|---|
| CN | 104521297 A | 4/2015 |
| CN | 104540099 A | 4/2015 |
| CN | 105407156 A | 3/2016 |
| EP | 2797347 A1 | 10/2014 |
| WO | 2011025306 A2 | 3/2011 |
| WO | 2013123874 A1 | 8/2013 |

OTHER PUBLICATIONS

3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 12), 3GPP TS 36.305 V12.2.0 (Dec. 2014), 59 pages.

* cited by examiner

POSITIONING BASE STATION DETERMINING METHOD, POSITIONING SERVER, SERVING BASE STATION, AND NETWORK SYSTEM

CROSS-REFERENCE TO RELATED APPLICATIONS

This application is a continuation of International Application No. PCT/CN2016/086728, filed on Jun. 22, 2016, the disclosure of which is hereby incorporated by reference in its entirety.

TECHNICAL FIELD

The present disclosure relates to the mobile communications field, and in particular, to a technology for determining a positioning base station configured to position a terminal device.

BACKGROUND

With development of communications services, a positioning service plays an important role as an indispensable part in mobile communications and personal communications services. In recent years, a continuously improving living standard also gradually increases a demand for location services. For example, there is a growing demand for positioning in scenarios such as security monitoring, emergency rescue, and travel guiding. Positioning information of user equipment (UE) is extremely important particularly in a special application scenario such as an emergency rescue scenario.

In a Long Term Evolution (LTE) system, a network device or UE measures a reference signal used for positioning, and calculates a measurement result according to a positioning algorithm, to obtain location coordinates of the UE. The measurement result may include one or more of a field strength of the signal, a time difference of arrival of the signal, an angle of arrival of the signal, and the like.

In a current system, a network device or a positioning server receives a positioning request of UE, instructs the UE to report neighboring cell information to the network device or the positioning server, and selects, according to the reported neighboring cell information, a base station participating in positioning. In the positioning process, the network device or the positioning server needs to instruct, after receiving the positioning request, the UE to report the neighboring cell information, and in response to the instruction, the UE measures and reports the neighboring cell information to the network device or the positioning server. Consequently, because the network device or the positioning server cannot obtain the neighboring cell information in time, positioning is relatively slow, positioning efficiency is relatively low, and a requirement cannot be met in a scenario with a relatively urgent demand for positioning information.

Therefore, currently no effective solution is available for addressing the foregoing situation.

SUMMARY

Embodiments of the present disclosure provide a positioning base station determining method, a positioning server, a base station, and a network system, so as to reduce a positioning time and improve positioning efficiency.

A first aspect provides a positioning base station determining method. The method includes receiving, by a positioning server, a positioning request message from a terminal device. The method also includes obtaining, by the positioning server, information about a candidate base station from a serving base station according to the positioning request message, where the serving base station is a serving base station of the terminal device, and the information about a candidate base station indicates at least one base station. The method also includes determining, by the positioning server, a positioning base station set according to the information about a candidate base station, where the positioning base station set includes a positioning base station configured to position the terminal device, and the positioning base station includes one or more of the at least one base station and/or the serving base station.

According to the foregoing method, the positioning serve may directly obtain the positioning base station set from the serving base station and determine a base station for positioning, without a need of instructing the terminal device to perform measurement and report a measurement result to the positioning serve, thereby reducing a positioning time.

Optionally, the obtaining, by the positioning server, information about a candidate base station from a serving base station according to the positioning request message includes: sending, by the positioning server, indication information to the serving base station according to the positioning request message, where the indication information is used to instruct the serving base station to send the information about a candidate base station; and receiving, by the positioning server, the information about a candidate base station from the serving base station.

Optionally, the positioning request message includes an identifier of the serving base station; and the sending, by the positioning server, indication information to the serving base station according to the positioning request message includes: sending, by the positioning server, the indication information to the serving base station according to the identifier of the serving base station, where the indication information includes an identifier of the terminal device.

Optionally, the obtaining, by the positioning server, information about a candidate base station from a serving base station according to the positioning request message includes: directly obtaining, by the positioning server, the information about a candidate base station from the serving base station by integrating the positioning server into the serving base station.

Optionally, the information about a candidate base station includes an identifier of the at least one base station; and the determining, by the positioning server, a positioning base station set according to the information about a candidate base station includes: determining, by the positioning server, the positioning base station set according to the identifier of the at least one base station.

Optionally, the information about a candidate base station includes an identifier of at least one neighboring cell; and the determining, by the positioning server, a positioning base station set according to the information about a candidate base station includes: determining, by the positioning server, the positioning base station set according to the identifier of the at least one neighboring cell.

Optionally, the information about a candidate base station further includes status information of the at least one base station; and the determining, by the positioning server, a positioning base station set according to the information about a candidate base station includes: determining, by the positioning server, the positioning base station set according to the identifier and the status information of the at least one base station.

A second aspect provides a positioning server, including a receiving unit, a processing unit, and a sending unit.

The receiving unit is configured to receive a positioning request message from a terminal device.

The processing unit is configured to obtain information about a candidate base station from a serving base station according to the positioning request message, and determine a positioning base station set according to the information about a candidate base station.

The serving base station is a serving base station of the terminal device, the information about a candidate base station indicates at least one base station, the positioning base station set includes a positioning base station configured to position the terminal device, and the positioning base station includes one or more of the at least one base station and/or the serving base station.

Optionally, the sending unit is configured to send indication information to the serving base station according to the positioning request message. The indication information is used to instruct the serving base station to send the information about a candidate base station.

The receiving unit receives the information about a candidate base station from the serving base station.

The sending unit is configured to send the indication information to the serving base station according to the positioning request message in the following manner: sending the indication information to the serving base station according to an identifier of the serving base station, where the indication information includes an identifier of the terminal device.

Optionally, the positioning server is integrated into the serving base station; and the processing unit is configured to obtain the information about a candidate base station from the serving base station according to the positioning request message in the following manner: directly obtaining, by the processing unit, the information about a candidate base station from the serving base station.

Optionally, the information about a candidate base station includes an identifier of the at least one base station; and the processing unit is configured to determine the positioning base station set according to the information about a candidate base station in the following manner: determining the positioning base station set according to the identifier of the at least one base station.

Optionally, the information about a candidate base station includes an identifier of at least one neighboring cell; and the processing unit is configured to determine the positioning base station set according to the information about a candidate base station in the following manner: determining the positioning base station set according to the identifier of the at least one neighboring cell.

Optionally, the information about a candidate base station further includes status information of the at least one base station; and the processing unit is configured to determine the positioning base station set according to the information about a candidate base station in the following manner: determining the positioning base station set according to the identifier and the status information of the at least one base station.

Optionally, each functional unit of the positioning server may be implemented by corresponding hardware, or may be completed by corresponding hardware executing corresponding software. For example, the foregoing sending unit may be hardware that has a function of executing the foregoing sending module, such as a transmitter, or may be a general processor or another hardware device that can execute a corresponding computer program, so as to complete the foregoing function. For another example, the foregoing processing unit may be hardware that has a function of executing the foregoing processing module, such as a processor, or may be another hardware device that can execute a corresponding computer program, so as to complete the foregoing function. For still another example, the foregoing receiving unit may be hardware that has a function of executing the foregoing receiving module, such as a receiver, or may be a general processor or another hardware device that can execute a corresponding computer program, so as to complete the foregoing function.

A third aspect provides a positioning base station determining method, including: receiving, by a serving base station, indication information from the positioning server, where the indication information is used to instruct the serving base station to send information about a candidate base station, and the serving base station is a serving base station of a terminal device; and sending, by the serving base station, the information about a candidate base station, where the information about a candidate base station indicates at least one base station, and the information about a candidate base station is used to determine a positioning base station set.

The positioning base station set includes a positioning base station configured to position the terminal device.

A fourth aspect provides a base station, and the base station is a serving base station of a terminal device and includes a storage unit, a receiving unit, a sending unit, and a processing unit.

The storage unit is configured to store information about a candidate base station.

The receiving unit is configured to obtain indication information from a positioning server. The indication information is used to instruct the base station to send the information about a candidate base station used for positioning the terminal device.

The sending unit is configured to send the information about a candidate base station. The information about a candidate base station indicates at least one base station, and the information about a candidate base station is used to determine a positioning base station set.

The processing unit is configured to determine the information about a candidate base station according to the indication information, and instruct the sending unit to send the information about a candidate base station.

The positioning base station set includes a positioning base station configured to position the terminal device.

Optionally, the information about a candidate base station includes an identifier of the at least one base station and/or an identifier of at least one neighboring cell, and the identifier of the at least one neighboring cell is used to indicate at least one base station.

Optionally, the information about a candidate base station further includes status information of the at least one base station, and the status information includes receive power of the terminal device.

Optionally, the information about a candidate base station includes neighboring base station information of the serving base station and/or neighboring base station information of one or more terminal devices, and the serving base station is a serving base station of the one or more terminal devices.

Optionally, a corresponding functional unit of the base station may be implemented by corresponding hardware, or may be implemented by corresponding hardware executing corresponding software. For example, the foregoing sending unit may be hardware that has a function of executing the foregoing sending module, such as a transmitter, or may be a general processor or another hardware device that can execute a corresponding computer program, so as to complete the foregoing function. For another example, the foregoing processing unit may be hardware that has a function of executing the foregoing processing module, such as a processor, or may be another hardware device that can execute a corresponding computer program, so as to complete the foregoing function. For still another example, the foregoing receiving unit may be hardware that has a function of executing the foregoing receiving module, such as a receiver, or may be a general processor or another hardware device that can execute a corresponding computer program, so as to complete the foregoing function. The foregoing storage unit may be any computer readable storage medium, and the storage medium may include a read-only memory (ROM), a random access memory (RAM), a magnetic disk, an optical disc, or the like.

For the foregoing aspects, the embodiments of the present disclosure may further include the following optional embodiments.

Optionally, the positioning request message includes an identifier of the serving base station of the terminal device.

Optionally, the serving base station may be one base station or a group of base stations responsible for direct communication with the terminal device.

Optionally, the information about a candidate base station includes an identifier of the at least one base station and/or an identifier of at least one neighboring cell, and the identifier of the at least one neighboring cell is used to indicate at least one base station.

Optionally, the information about a candidate base station further includes status information of the at least one base station, and the status information includes receive power of the terminal device.

Optionally, the information about a candidate base station includes neighboring base station information of the serving base station and/or neighboring base station information of one or more terminal devices, and the serving base station is a serving base station of the one or more terminal devices.

A fifth aspect provides a network system, including a positioning server, a first base station, and at least one second base station.

The positioning server is configured to: receive a positioning request message from a terminal device; send indication information to the first base station according to the positioning request message; obtain information about a candidate base station from the first base station, where the information about a candidate base station indicates the at least one second base station; and determine a positioning base station set according to the information about a candidate base station.

The first base station is configured to obtain the indication information from the positioning server, and send the information about a candidate base station to the positioning server.

The positioning base station set includes a positioning base station configured to position the terminal device, and the positioning base station includes one or more of the at least one second base station and/or the first base station.

Optionally, the at least one second base station is configured to receive a positioning notification from the positioning server, and send a positioning reference signal to the terminal device.

Optionally, the positioning request message includes an identifier of the first base station; and the positioning server sends the indication information to the first base station according to the identifier of the first base station. The indication information may include an identifier of the terminal device.

Optionally, the information about a candidate base station includes an identifier of the at least one second base station; and the positioning server is configured to determine the positioning base station set according to the identifier of the at least one second base station.

Optionally, the information about a candidate base station includes an identifier of at least one neighboring cell; and the positioning server is configured to determine the positioning base station set according to the identifier of the at least one neighboring cell.

Optionally, the information about a candidate base station further includes status information of the at least one second base station; and the positioning server determines the positioning base station set according to the identifier and the status information of the at least one second base station.

The serving base station mentioned in the first aspect to the fourth aspect may be referred to as the first base station, and the at least one base station indicated by the information about a candidate base station may be referred to as the second base station.

The positioning base station determining method provided in the embodiments of the present disclosure is applied to specific terminal device positioning, so that the positioning server directly requests the information about a candidate base station from the serving base station, to determine the positioning base station set.

The positioning server receives the positioning request message sent by the terminal device, and sends the indication information to the serving base station of the terminal device. A neighboring cell list field "Neighboring cell list" is added into the indication information sent by the positioning server to the serving base station, so that the positioning server uses the field to request the serving base station to return the information about a candidate base station. In response to the indication information, the serving base station adds a neighboring cell list field "Neighbor cell list" into a response message to be sent to the positioning server, and provides the positioning server with the information about a candidate base station by using the field.

In the solution provided in the embodiments of the present disclosure, a new positioning base station determining method is proposed, so that the positioning server directly obtains the information about a candidate base station from the serving base station, and determines, in time, the positioning base station set used for positioning, thereby improving positioning efficiency.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of the present disclosure clearer, the following further describes the embodiments of the present disclosure in detail with reference to the accompanying drawings.

Figure 1:
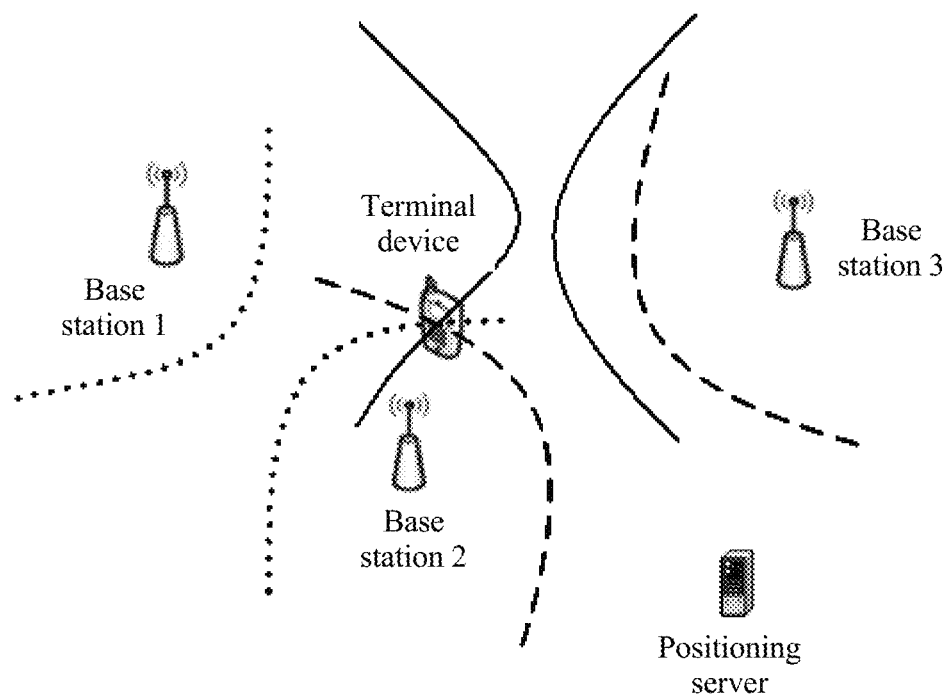
FIG. 1 is a schematic diagram of a network architecture for positioning a terminal device according to an embodiment of the present disclosure.

FIG. 1 shows a network architecture in a positioning base station determining method according to an embodiment of the present disclosure. The network architecture includes a base station 1, a base station 2, a base station 3, a terminal device, and a positioning server. In a technical solution in this embodiment of the present disclosure, the positioning server calculates a location of the terminal device.

A positioning algorithm based on time difference of arrival (TDOA) measurement is an important positioning algorithm. An observed time difference of arrival (OTDOA) and an uplink-time difference of arrival (U-TDOA) are common positioning technologies based on time difference of arrival measurement. In both OTDOA and U-TDOA methods, the location of the terminal device is determined by detecting a time difference of arrival of a signal. To perform precise positioning, the OTDOA/U-TDOA method requires that at least three base stations simultaneously participate in positioning parameter measurement. The OTDOA and U-TDOA methods are used as an example below to describe a terminal device positioning method.

When the OTDOA positioning technology is used, the positioning server determines three or more base stations, and calculates the location of the terminal device based on a time difference (RSTD) of arrival at the terminal device for reference signals sent by the base stations. Specifically, in an LTE system, an evolved serving mobile location center (E-SMLC) determines a plurality of base stations participating in positioning, and obtains positioning reference signal (PRS) configuration information of the plurality of base stations. According to the PRS configuration information of the base stations participating in positioning, the terminal device receives and measures PRSs sent by the base stations, and sends a measurement result to the E-SMLC. The E-SMLC calculates the location of the terminal device according to the measurement result. The PRS configuration information includes but is not limited to one or more pieces of information such as resource mapping (for example, resource element (RE) mapping) information, an initial PRS sequence value, subframe configuration information, base station location coordinates used for positioning, and neighboring cell information. The subframe configuration information may be configuration information of a subframe used to carry the PRS. The terminal device may obtain, from the E-SMLC by using an auxiliary data message defined by the LTE Positioning Protocol (LPP), the PRS configuration information of the base stations participating in positioning.

The auxiliary data message provided by the LPP may include the following information:

(1) Reference cell information, including information such as a physical cell identifier (PCI) of a reference cell and/or PRS configuration information. The reference cell may be but is not limited to a serving cell of a to-be-positioned terminal device, and may be another cell, such as a neighboring cell of the serving cell.

(2) Neighboring cell list, including information such as a PCI and a PRS configuration of each neighboring cell. The neighboring cell list includes some neighboring cells with convenient PRS measurement that are selected according to pre-estimation of the location of the terminal device.

When the U-TDOA positioning technology is used, the positioning server determines three or more base stations, and calculates the location of the terminal device according to a time difference RSTD of arrival at each base station for a reference signal sent by the terminal device to each base station. Specifically, in an LTE system, an E-SMLC determines a plurality of base stations participating in positioning, and obtains configuration information of a sounding reference signal (SRS) sent by the terminal device. According to the SRS configuration information, the base stations participating in positioning receive and measure the SRS sent by the terminal device, and send measurement results to the E-SMLC. The E-SMLC calculates the location of the terminal device according to the measurement results. The SRS configuration information includes but is not limited to resource mapping (for example, RE mapping) information, an initial SRS sequence value, and subframe configuration information. The subframe configuration information may be configuration information of a subframe used to carry the SRS. The base station may obtain the SRS configuration information of the terminal device from the E-SMLC by using an auxiliary data message defined by the LPP. For content that may be included in the auxiliary data message, refer to the foregoing descriptions. Details are not described herein again.

In an existing terminal device positioning method (including but not limited to the U-TDOA and OTDOA methods), the positioning server first determines candidate base stations, and selects, from the determined candidate base stations, a base station participating in positioning. The positioning server usually responds to a positioning request of the terminal device, and instructs the terminal device to report information about a neighboring base station. The terminal device measures the information about the neighboring base station or information about a neighboring cell, and reports a measurement result to the positioning server. The positioning server determines the candidate base stations according to the measurement result, and further selects the base station participating in positioning. Consequently, when the terminal device measures the neighboring base station or the neighboring cell, the positioning server is in a waiting state, thereby prolonging positioning.

The embodiments of the present disclosure provide a positioning base station determining method in which a base station can be effectively selected for positioning, thereby increasing a positioning speed, and improving positioning efficiency.

The terminal device in the embodiments of the present disclosure may be a device that provides a user with voice and/or data connectivity, a handheld device with a radio connection function, or another processing device connected to a wireless modem. A wireless terminal may communicate with one or more core networks through a radio access network (RAN). The wireless terminal may be a mobile terminal, such as a mobile phone (or referred to as a "cellular" phone) or a computer with a mobile terminal, for example, may be a portable, pocket-sized, handheld, or computer built-in mobile apparatus, or an in-vehicle mobile apparatus, which exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

The base station in the embodiments of the present disclosure includes but is not limited to one or more of a macro base station, a micro base station, a pico base station, a pico remote radio unit (pRRU) and a remote radio unit (RRH) and the like that belong to a same macro base station, and a pRRU, an RRH, and the like that belong to different macro base stations. In addition, the base station may be a base station in a Global System for Mobile Communications (GSM) system or a Code Division Multiple Access (CDMA) system, or may be a NodeB in a Wideband Code Division Multiple Access (WCDMA) system, or may be an evolved NodeB (eNB or eNodeB) in LTE, which is not limited in this application.

The positioning server mentioned in the embodiments of the present disclosure may be a logical entity (for example, a network element that participates in positioning and that is disposed in a network device) or a hardware device integrated into the network device, or may be a network element device independent of a base station or another network device. This is not limited in this application.

In the terminal device positioning method provided in the embodiments of the present disclosure, a reference signal needs to be transmitted between a network device and a terminal device by using a selected resource. The resource may be allocated by the network device, or may be selected by the terminal device in a resource pool allocated by the network device. The resource may be any resource in time-frequency domain.

Figure 2:
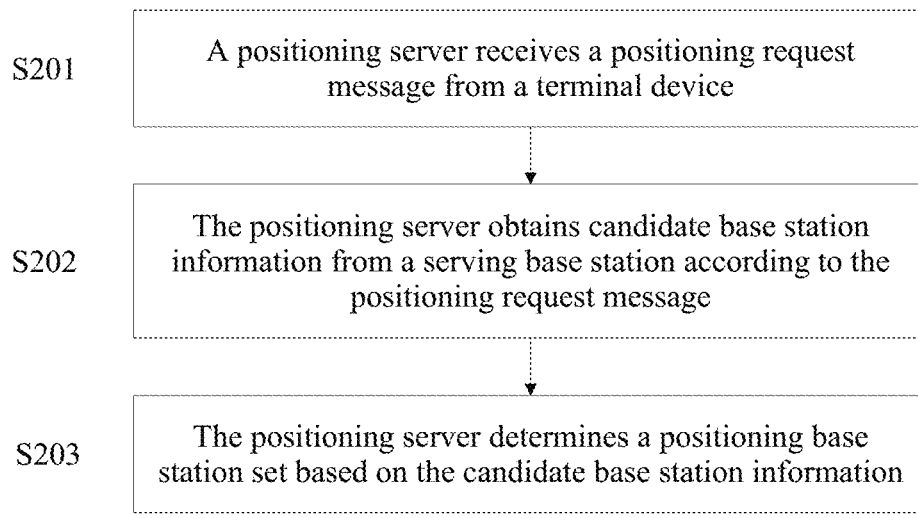
FIG. 2 is a schematic flowchart of a positioning base station determining method according to an embodiment of the present disclosure.

Referring to FIG. 2, the following describes a positioning base station determining method according to an embodiment of the present disclosure.

S201. A positioning server receives a positioning request message from a terminal device.

S202. The positioning server obtains information about a candidate base station from a serving base station according to the positioning request message, where the serving base station is a serving base station of the terminal device, and the information about a candidate base station indicates at least one base station.

S203. The positioning server determines a positioning base station set according to the information about a candidate base station, where the positioning base station set includes a positioning base station configured to position the terminal device, and the positioning base station includes one or more of the at least one base station and/or the serving base station.

This embodiment of the present disclosure provides the positioning base station determining method. The positioning server may directly obtain the information about a candidate base station from the serving base station, so as to determine the positioning base station set used for positioning. By using the positioning base station determining method provided in this embodiment of the present disclosure, the positioning server can obtain the information about a candidate base station in time, thereby reducing a positioning time, and improving positioning efficiency.

It should be noted that the serving base station in this embodiment of the present disclosure may be one base station or a group of base stations responsible for direct communication with the terminal device. For example, if the terminal device supports a carrier aggregation technology, the serving base station may be a base station corresponding to each carrier. For another example, the serving base station may be a group of base stations configured to search for the terminal device. If the terminal device is in an idle state and does not communicate with the base station, one or more base stations are configured to attempt to contact the terminal device when a network system needs to wake up the idle terminal device, and the one or more base stations are also considered as serving base stations in this embodiment of the present disclosure.

To avoid ambiguity, in all embodiments of the present disclosure, the serving base station may be referred to as a first base station, and the at least one base station indicated by the information about a candidate base station is referred to as a second base station.

In an optional embodiment, the terminal device sends the positioning request message to the positioning server, and the positioning server receives the positioning request message, and requests the information about a candidate base station from the serving base station of the terminal device.

Specifically, the positioning server may send indication information to the serving base station according to the positioning request message, and receive the information about a candidate base station from the serving base station. The indication information is used to instruct the serving base station to send the information about a candidate base station. The positioning request message may include an identifier of the serving base station, and the positioning server sends the indication information to the serving base station according to the identifier of the serving base station. Optionally, the terminal device sends identification information of the serving base station of the terminal device, together with the positioning request message, to the positioning server.

In another possible case, the positioning server is integrated into the serving base station of the terminal device, and provides a positioning service for the terminal device served by the serving base station. In this case, the positioning server may directly obtain the information about a candidate base station from the serving base station.

It should be noted that the information about a candidate base station used to indicate the at least one base station in this embodiment of the present disclosure may include an identifier of the at least one base station and/or an identifier of at least one neighboring cell.

In an optional embodiment, the information about a candidate base station includes an identifier of the at least one base station, and the at least one base station includes a neighboring base station of the serving base station. The serving base station obtains information about the neighboring base station, and stores the information as the information about a candidate base station. The information about a candidate base station includes at least an identifier of the neighboring base station.

Specifically, the serving base station may obtain the information about the neighboring base station in a plurality of manners.

For example, in an implementation, the serving base station obtains a neighboring base station of the terminal device to serve as the neighboring base station. The serving base station instructs the terminal device to measure the information about the neighboring base station, and report a measurement result to the serving base station. The serving base station determines the neighboring base station of the serving base station according to the measurement result reported by the terminal device, and stores the information about the neighboring base station. The serving base station may instruct the terminal device to periodically perform measurement and reporting.

Optionally, the terminal device may report, to the serving base station in a form of a neighboring base station list, the information about the neighboring base station obtained through measurement, and the neighboring base station list includes at least an identifier of the neighboring base station. The serving base station stores the information about the neighboring base station as the information about a candidate base station.

Optionally, the terminal device may report, to the serving base station in a form of a neighboring cell list, the information about the neighboring base station obtained through measurement, and the neighboring cell list includes at least an identifier of a neighboring cell. The serving base station obtains base station information of the neighboring cell according to the identifier of the neighboring cell, and stores the base station information as the information about a candidate base station. Specifically, the serving base station may obtain the base station information of the neighboring cell by using the identifier of the neighboring cell in a plurality of manners in the prior art. For example, the serving base station may send a query instruction to a surrounding base station by using a communications interface between base stations (for example, a communications interface X2 between eNodeBs), and a base station in a neighboring cell responds to the query instruction, and feeds back an identifier of the base station in the neighboring cell to the serving base station.

In this implementation, the terminal device may measure a signal of a surrounding base station or cell, obtain information such as an identifier and/or receive power of the surrounding base station or cell, and determine the information about the neighboring base station or the neighboring cell. For example, the terminal device may select all surrounding base stations or cells that can receive a signal, to serve as the neighboring base station or cell; or may select a surrounding base station or cell whose receive power is greater than a specific threshold, to serve as the neighboring base station or the neighboring cell. Specific measurement and selection manners are not specifically limited herein.

For another example, in another implementation, the serving base station may obtain the information about the neighboring base station from network optimization or planning software. The network optimization or planning software may be in the serving base station, or may be in another network element in a network. The network optimization or planning software can determine the neighboring base station of the serving base station by using a network environment and network topology information. Therefore, the serving base station can obtain the information about the neighboring base station from the network optimization or planning software.

For still another example, in still another implementation, the serving base station stores network topology structure information with a specific area range, determines the neighboring base station according to the stored network topology structure information, and obtains the information about the neighboring base station. Because various complex network topology structures have a very large data volume, the serving base station may selectively store the network topology structure information with the specific area range, for example, a base station quantity, a terminal device quantity, and corresponding communication quality. Responding to a positioning request of the positioning server, the serving base station determines the information about the neighboring base station from the network topology structure information.

In another optional embodiment, the information about a candidate base station includes an identifier of the at least one base station, and the at least one base station includes a neighboring base station of the terminal device. The serving base station obtains information about the neighboring base station, and stores the information as the information about a candidate base station. The information about a candidate base station includes at least the identifier of the at least one base station.

Specifically, the serving base station may obtain the information about the neighboring base station in a plurality of manners.

For example, in an implementation, the serving base station instructs the terminal device to report the information about the neighboring base station to the serving base station, determines the neighboring base station according to the information reported by the terminal device, and stores the information about the neighboring base station. The serving base station may instruct the terminal device to periodically perform measurement and reporting.

Optionally, the terminal device may report, to the serving base station in a form of a neighboring base station list, the information about the neighboring base station obtained through measurement, and the neighboring base station list includes at least an identifier of the neighboring base station. The serving base station stores the information about the neighboring base station as the information about a candidate base station.

Optionally, the terminal device may report, to the serving base station in a form of a neighboring cell list, the information about the neighboring base station obtained through measurement, and the neighboring cell list includes at least an identifier of a neighboring cell. The serving base station obtains base station information of the neighboring cell according to the identifier of the neighboring cell, and stores the base station information as the information about a candidate base station. Specifically, the serving base station may obtain the base station information of the neighboring cell by using the identifier of the neighboring cell in a plurality of manners in the prior art. For example, the serving base station may send a query instruction to a surrounding base station by using a communications interface between base stations (for example, a communications interface X2 between eNodeBs), and a base station in a neighboring cell responds to the query instruction, and feeds back an identifier of the base station in the neighboring cell to the serving base station.

In this implementation, the terminal device may measure a signal of a surrounding base station or cell, obtain information such as an identifier and/or receive power of the surrounding base station or cell, and determine the information about the neighboring base station or the neighboring cell. For example, the terminal device may select all surrounding base stations or cells that can receive a signal, to serve as the neighboring base station or cell; or may select a surrounding base station or cell whose receive power is greater than a specific threshold, to serve as the neighboring base station or the neighboring cell. Specific measurement and selection manners are not specifically limited herein.

Further, to distinguish between neighboring base stations of different terminal devices, the serving base station performs associated storage on an identifier of the terminal device and the information about the neighboring base station or cell that is reported by the terminal device to the serving base station.

For another example, in another implementation, the serving base station may obtain the information about the neighboring base station from network optimization or planning software. The network optimization or planning software may be in the serving base station, or may be in another network element in a network. The network optimization or planning software can determine the neighboring base station of the terminal device by using a network environment and network topology information. Therefore, the serving base station can obtain the information about the neighboring base station from the network optimization or planning software.

In still another optional embodiment, the information about a candidate base station includes an identifier of at least one neighboring cell, and the at least one neighboring cell includes a neighboring cell of the terminal device. The serving base station obtains information about the neighboring cell, and stores the information as the information about a candidate base station. The information about a candidate base station includes at least an identifier of the neighboring cell.

Specifically, the serving base station instructs the terminal device to measure the information about the neighboring cell and report the information about the neighboring cell to the serving base station. The serving base station determines the neighboring cell of the terminal device according to a measurement result reported by the terminal device, and stores the information about the neighboring cell. The serving base station may instruct the terminal device to periodically perform measurement and reporting.

Optionally, the terminal device may report, to the serving base station in a form of a neighboring cell list, the information about the neighboring cell obtained through measurement, and the neighboring cell list includes at least an identifier of a neighboring cell. The serving base station stores the information about the neighboring cell as the information about a candidate base station. For a manner of determining the neighboring cell, refer to descriptions of the foregoing optional embodiments. Details are not described herein again.

In this optional embodiment, the information about a candidate base station stored in the serving base station includes the information about the at least one neighboring cell. The serving base station reports the information about a candidate base station to the positioning server, so that the positioning server determines base station information of the at least one neighboring cell according to the information about the at least one neighboring cell.

In still another optional embodiment, the information about a candidate base station includes an identifier of the at least one base station and an identifier of at least one neighboring cell. The at least one base station includes a neighboring base station of the serving base station and/or a neighboring base station of the terminal device, and the at least one neighboring cell includes a neighboring cell of the terminal device. The serving base station obtains information about the neighboring base station and the neighboring cell, and stores the information as the information about a candidate base station. The information about a candidate base station includes at least the identifier of the at least one base station and the identifier of the at least one cell.

Specifically, for a manner of obtaining the information about the neighboring base station and the neighboring cell by the serving base station, refer to descriptions in the foregoing optional embodiments. Details are not described herein again.

In this optional embodiment, the information about a candidate base station stored in the serving base station includes the information about the at least one neighboring cell. The serving base station reports the information about a candidate base station to the positioning server, so that the positioning server determines base station information of the at least one neighboring cell according to the information about the at least one neighboring cell. Specifically, the serving base station may obtain the base station information of the neighboring cell by using the identifier of the neighboring cell in a plurality of manners in the prior art. For example, the serving base station may send a query instruction to a surrounding base station by using a communications interface between base stations (for example, a communications interface X2 between eNodeBs), and a base station in a neighboring cell responds to the query instruction, and feeds back an identifier of the base station in the neighboring cell to the serving base station.

In step S203, the positioning server determines the positioning base station set according to the information about a candidate base station. In this embodiment of the present disclosure, the information about a candidate base station used to indicate the at least one base station may include an identifier of the at least one base station and/or an identifier of at least one neighboring cell. Therefore, before determining the positioning base station set, the positioning server needs to determine information about a candidate base station according to the information about a candidate base station.

When the information about a candidate base station includes the identifier of the at least one base station, the positioning server determines the positioning base station set according to the identifier of the at least one base station.

When the information about a candidate base station includes the identifier of the at least one neighboring cell, the positioning server determines the positioning base station set according to the identifier of the at least one neighboring cell. Specifically, the positioning server may determine, according to the identifier of the at least one neighboring cell, information about at least one base station corresponding to the at least one neighboring cell, and then determine the positioning base station set according to the information about the at least one base station.

Specifically, the positioning server may determine the positioning base station set according to the information about the at least one base station included in the information about a candidate base station in a plurality of manners.

For example, in an implementation, the information about the at least one base station includes at least the identifier of the at least one base station. The positioning server may send a request message to the at least one base station according to the identifier of the at least one base station. The request message is used to request the at least one base station to feed back at least one piece of information such as base station coordinates, base station load, and a positioning reference signal configuration of a base station. The at least one base station responds to the request message and feeds back corresponding information. The positioning server determines, according to the information fed back by the at least one base station, a base station participating in positioning.

Further, the request message is further used to request the at least one base station to feed back information about a neighboring base station or a neighboring cell. The at least one base station responds to the request message and feeds back corresponding information. The positioning server obtains, according to the feedback information, more base stations that can be configured to position the terminal device. The positioning server may send a request message to the neighboring base station or a base station of the neighboring cell, and the neighboring base station or the neighboring cell is fed back by the at least one base station. The request message is used to request to obtain a neighboring base station or a neighboring cell of the neighboring base station or the neighboring cell, so as to obtain more base stations that can be configured to position the terminal device. In this step, more candidate base stations configured to position the terminal device are provided for the positioning server, so that the positioning server can determine a specific quantity of most appropriate base stations to position the terminal device.

For another example, in another implementation, information about the at least one base station includes at least an identifier of the at least one base station and status information of the at least one base station, and the positioning server determines the positioning base station set according to the identifier and the status information of the at least one base station.

Optionally, the status information of the at least one base station may include receive power of the terminal device. The positioning server may select, according to the receive power, first N base stations with relatively large receive power in the at least one base station and the serving base station, to serve as positioning base stations, and determine the positioning base station set, where N is a positive integer.

Optionally, the status information of the at least one base station may include at least one of a path loss estimated by a base station, base station coordinates, a positioning reference signal configuration of a base station, base station load, receive power of a base station, an uplink/downlink signal receiving time of a base station, and the like. The positioning server may select N appropriate base stations as positioning base stations according to one or more pieces of the foregoing status information, and determine the positioning base station set, where N is a positive integer.

In this implementation, the status information of the at least one base station indicated by the information about a candidate base station may be sent by the serving base station to the positioning server. The status information may be sent to the positioning server by the serving base station together with the identifier of the at least one base station, or may be independently sent to the positioning server by the serving base station. For example, the serving base station may first send the identifier of the at least one base station to the positioning server, respond to a requirement imposed by the positioning server on the status information of the at least one base station, obtain the status information of the at least one base station, and send the status information to the positioning server. Alternatively, the serving base station automatically obtains the status information of the at least one base station according to the identifier of the at least one base station, and simultaneously or separately sends the identifier and the status information to the positioning server. There are a plurality of implementations in the prior art for obtaining the status information of the at least one base station by the serving base station. Details are not described herein again.

For any one of the foregoing embodiments or implementations, it should be noted that three or more positioning base stations are required for a positioning method such as the OTDOA or U-TDOA. Therefore, the information about a candidate base station needs to indicate at least two base stations. The positioning server determines M positioning base stations according to the information about a candidate base station, where M is greater than or equal to 3.

For example, the M positioning base stations include at least two of the at least two base stations indicated by the information about a candidate base station and the serving base station.

For another example, the information about a candidate base station indicates at least three base stations, and the N positioning base stations include at least three of the at least three base stations indicated by the information about a candidate base station.

Figure 3:
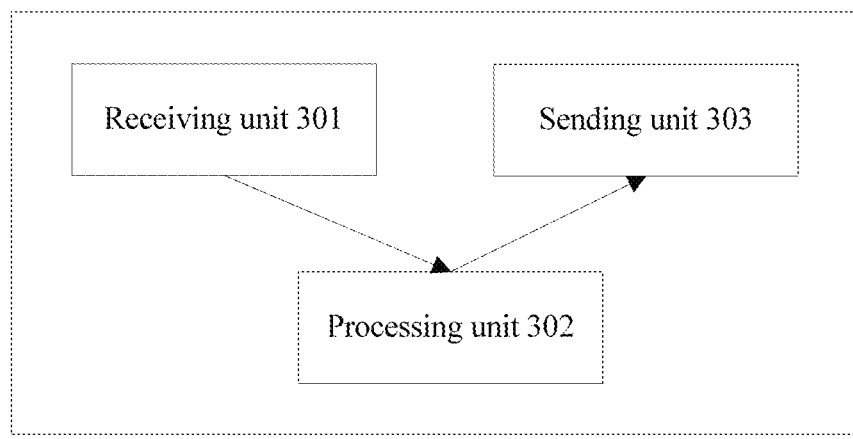
FIG. 3 is a schematic diagram of a possible structure of a positioning server according to an embodiment of the present disclosure.

Referring to FIG. 3, the following describes a positioning server according to an embodiment of the present disclosure.

The positioning server includes a receiving unit 301, a processing unit 302, and a sending unit 303, and may further include a storage unit (not shown in the figure) according to an actual requirement.

The receiving unit 301 is configured to receive a positioning request message from a terminal device.

The processing unit 302 is configured to obtain information about a candidate base station from a serving base station according to the positioning request message, and determine a positioning base station set according to the information about a candidate base station.

The sending unit 303 is configured to send indication information to the serving base station according to the positioning request message. The indication information is used to instruct the serving base station to send the information about a candidate base station. In addition, the receiving unit 301 receives the information about a candidate base station from the serving base station.

The serving base station is a serving base station of the terminal device, the information about a candidate base station indicates at least one base station, the positioning base station set includes a positioning base station configured to position the terminal device, and the positioning base station includes one or more of the at least one base station and/or the serving base station.

In an optional embodiment, the positioning request message includes an identifier of the serving base station of the terminal device, and the sending unit 303 sends the indication information to the serving base station according to the identifier of the serving base station.

In another optional embodiment, the information about a candidate base station includes an identifier of the at least one base station and/or an identifier of at least one neighboring cell.

Optionally, the processing unit 302 determines the positioning base station set according to the identifier of the at least one base station.

Optionally, the processing unit 302 determines, according to the identifier of the at least one cell, at least one base station corresponding to the at least one neighboring cell, and determines the positioning base station set according to information about the at least one base station.

Optionally, the processing unit 302 determines, according to the identifier of the at least one neighboring cell, at least one base station corresponding to the at least one neighboring cell, and determines the positioning base station set according to information about the at least one base station included in the information about a candidate base station and according to the information about the at least one base station determined by the at least one neighboring cell. The information about the at least one base station includes at least the identifier of the at least one base station.

Optionally, the information about a candidate base station further includes status information of the at least one base station. The positioning server determines the positioning base station set according to the identifier of the at least one base station and/or the identifier of the at least one neighboring cell and the status information.

Specifically, the status information includes receive power of the terminal device.

It should be noted that for specific implementations of receiving and sending information and determining the positioning base station set by the positioning server, reference may be made to the descriptions of the positioning base station determining method in the first embodiment of the present disclosure. The positioning server in this embodiment and the positioning base station determining method in the first embodiment of the present disclosure corresponding to FIG. 2 are according to a same concept, and therefore, have the same technical effects. Specific functions of the receiving unit 301, the processing unit 302, and the sending unit 303 included in the positioning server in this embodiment, terms, and implementation details are corresponding to functions in the method embodiment corresponding to FIG. 2. For specific content, refer to the descriptions in the method embodiment corresponding to FIG. 2 of the present disclosure. Details are not described herein again.

It should be noted that in actual application, a corresponding functional unit in this embodiment may be implemented by corresponding hardware, or may be completed by corresponding hardware executing corresponding software. For example, the sending unit 303 may be hardware that has a function of executing the foregoing sending module, such as a transmitter, or may be a general processor or another hardware device that can execute a corresponding computer program, so as to complete the foregoing function. For another example, the processing unit 302 may be hardware that has a function of executing the foregoing processing module, such as a processor, or may be another hardware device that can execute a corresponding computer program, so as to complete the foregoing function. For still another example, the receiving unit 301 may be hardware that has a function of executing the foregoing receiving module, such as a receiver, or may be a general processor or another hardware device that can execute a corresponding computer program, so as to complete the foregoing function.

Figure 4:
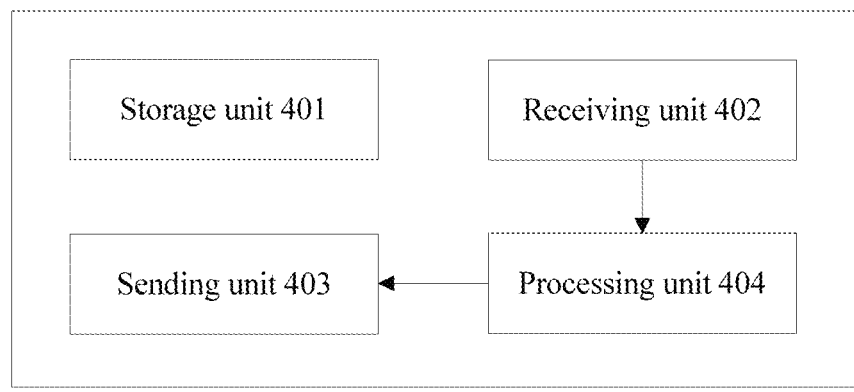
FIG. 4 is a schematic diagram of a possible structure of a serving base station according to an embodiment of the present disclosure.

Referring to FIG. 4, the following describes a possible structure of a serving base station according to an embodiment of the present disclosure.

The serving base station includes a storage unit 401, a receiving unit 402, a sending unit 403, and a processing unit 404.

The storage unit 401 is configured to store information about a candidate base station.

The receiving unit 402 is configured to obtain indication information from a positioning server. The indication information is used to instruct the base station to send the information about a candidate base station used for positioning a terminal device.

The sending unit 403 is configured to send the information about a candidate base station. The information about a candidate base station is used to determine a positioning base station set.

The processing unit 404 is configured to determine the information about a candidate base station according to the indication information, and instruct the sending unit 403 to send the information about a candidate base station.

The positioning base station set includes a positioning base station configured to position the terminal device.

In an optional embodiment, the information about a candidate base station stored by the storage unit 401 may be actively obtained by the serving base station, or may be reported by one or more terminal devices served by the serving base station.

In another optional embodiment, the information about a candidate base station includes an identifier of the at least one base station and/or an identifier of at least one neighboring cell, and the identifier of the at least one neighboring cell is used to indicate an identifier of at least one base station respectively corresponding to the at least one neighboring cell.

Optionally, the information about a candidate base station further includes status information of the at least one base station, and the status information includes receive power of the terminal device.

In another optional embodiment, the information about a candidate base station includes neighboring base station information of the serving base station and/or neighboring base station information of one or more terminal devices, and the serving base station is a serving base station of the one or more terminal devices.

It should be noted that for specific implementations of receiving, sending, and processing information by the serving base station, reference may be made to the descriptions of the positioning base station determining method in the first embodiment of the present disclosure. The serving base station in this embodiment and the positioning base station determining method in the first embodiment of the present disclosure corresponding to FIG. 2 are according to a same concept, and therefore, have the same technical effects. Specific functions of the storage unit 401, the receiving unit 402, the sending unit 403, and the processing unit 404 included in the serving base station in this embodiment, terms, and implementation details are corresponding to functions of the serving base station in the method embodiment corresponding to FIG. 2. For specific content, refer to the descriptions in the method embodiment corresponding to FIG. 2 of the present disclosure. Details are not described herein again.

It should be noted that in actual application, a corresponding functional unit in this embodiment may be implemented by corresponding hardware, or may be completed by corresponding hardware executing corresponding software. For example, the sending unit 403 may be hardware that has a function of executing the foregoing sending module, such as a transmitter, or may be a general processor or another hardware device that can execute a corresponding computer program, so as to complete the foregoing function. For another example, the processing unit 404 may be hardware that has a function of executing the foregoing processing module, such as a processor, or may be another hardware device that can execute a corresponding computer program, so as to complete the foregoing function. For still another example, the receiving unit 402 may be hardware that has a function of executing the foregoing receiving module, such as a receiver, or may be a general processor or another hardware device that can execute a corresponding computer program, so as to complete the foregoing function. The storage unit 401 may be any computer readable storage medium, and the storage medium may include a read-only memory (ROM), a random access memory (RAM), a magnetic disk, an optical disc, or the like.

Figure 5:
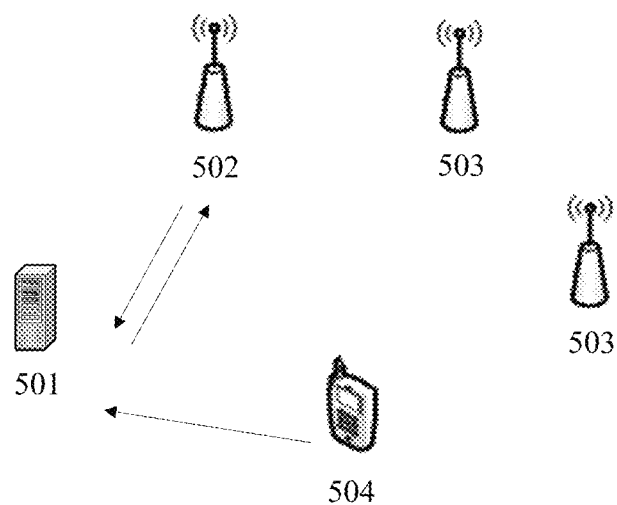
FIG. 5 is a schematic diagram of a network system for positioning a terminal device according to an embodiment of the present disclosure.

Referring to FIG. 5, the following describes a network system according to an embodiment of the present disclosure.

The network system includes a positioning server 501, a first base station 502, and at least one second base station 503.

The positioning server 501 is configured to: receive a positioning request message from a terminal device 504; send indication information to the first base station 502 according to the positioning request message; obtain information about a candidate base station from the first base station 502, where the information about a candidate base station indicates the at least one second base station 503; and determine a positioning base station set according to the information about a candidate base station.

The first base station 502 is configured to obtain the indication information from the positioning server 501, and send the information about a candidate base station to the positioning server 501.

The at least one second base station 503 is configured to receive a positioning notification from the positioning server, and send a positioning reference signal to the terminal device.

The positioning base station set includes a positioning base station configured to position the terminal device, and the positioning base station includes one or more of the at least one second base station and/or the first base station.

In an optional embodiment, the first base station 502 is a serving base station of the terminal device 504 that requests positioning. The positioning request message sent by the terminal device includes identification information of the serving base station of the terminal device, and the identification information is used by the positioning server 501 to determine the serving base station 502 of the terminal device 504. Further, optionally, the indication information sent by the positioning server 501 to the first base station 502 may include an identifier of the terminal device 504.

In this embodiment of the present disclosure, the information about a candidate base station may include one or more pieces of information, and the positioning server 501 determines the positioning base station set by using the one or more pieces of information.

Optionally, the information about a candidate base station includes an identifier of the at least one second base station 503, and the positioning server is configured to determine the positioning base station set according to the identifier of the at least one second base station.

Further, optionally, the information about a candidate base station includes an identifier of at least one neighboring cell, and the positioning server 501 is configured to determine the positioning base station set according to the identifier of the at least one neighboring cell.

Further, optionally, the information about a candidate base station further includes status information of the at least one second base station 503, and the positioning server 501 determines the positioning base station set according to the identifier and the status information of the at least one second base station 503.

In another optional embodiment, only the first base station 502 is configured to position the terminal device, and the at least one second base station 503 does not receive any positioning notification, and does not participate in positioning the terminal device.

In the foregoing network system mentioned in this embodiment of the present disclosure, the positioning server directly obtains the information about a candidate base station from the first base station, so as to determine the positioning base station set used for positioning, thereby reducing a positioning time, and improving positioning efficiency.

The positioning base station determining method provided in the embodiments of the present disclosure is applied to specific terminal device positioning, so that the positioning server directly requests the information about a candidate base station from the serving base station, to determine the positioning base station set.

The positioning server receives the positioning request message sent by the terminal device; and sends the indication information to the serving base station of the terminal device. A neighboring cell list field "Neighbor cell list" is added into the indication information sent by the positioning server to the serving base station, so that the positioning server uses the field to request the serving base station to return the information about a candidate base station. In response to the indication information, the serving base station adds a neighboring cell list field "Neighbor cell list" into a response message to be sent to the positioning server, and provides the positioning server with the information about a candidate base station by using the field.

The following uses OTDOA and U-TDOA methods as examples to separately describe a terminal device positioning method using the positioning base station determining method provided in the embodiments of the present disclosure.

Figure 6:
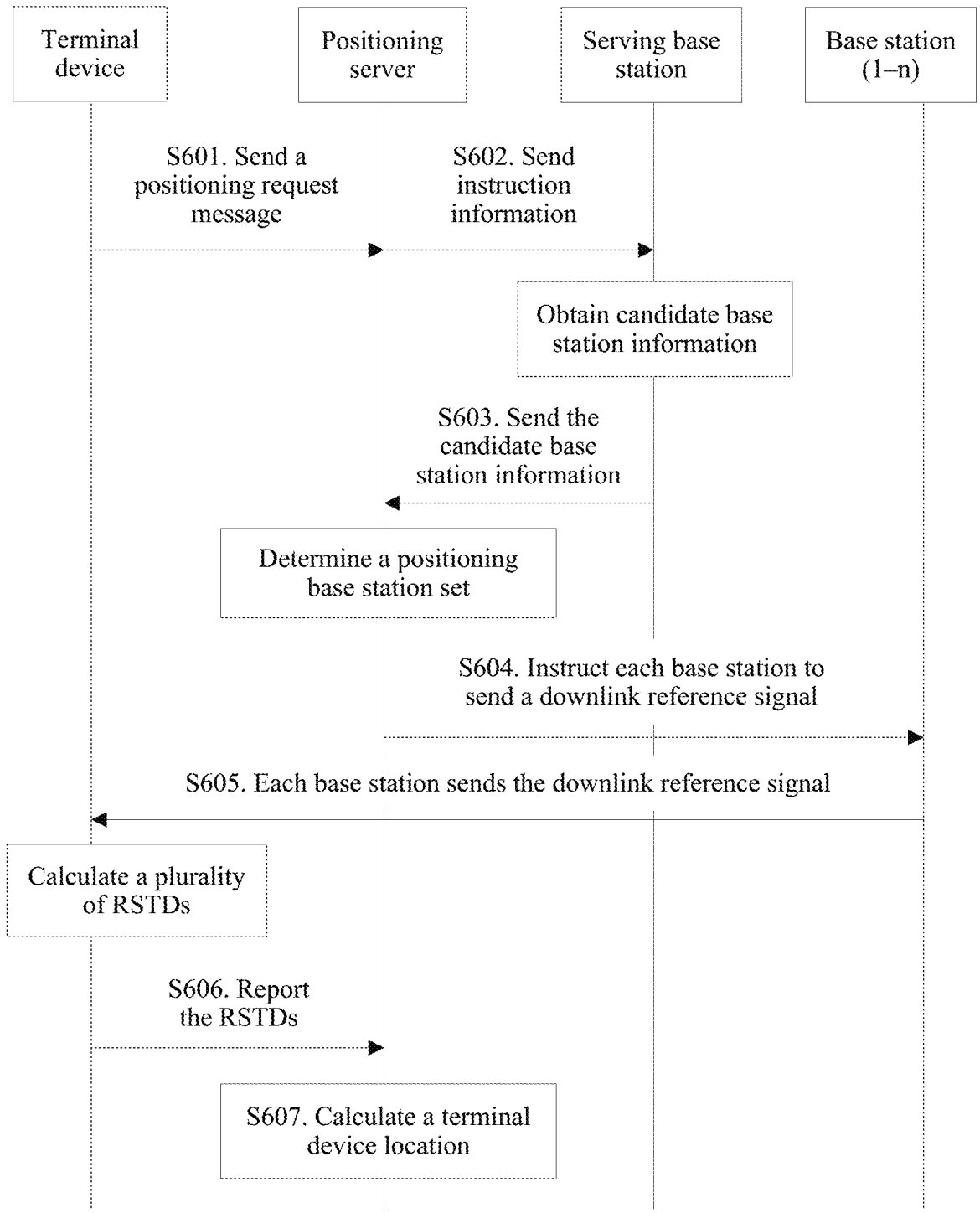
FIG. 6 is a schematic diagram of a positioning procedure of an OTDOA positioning method according to an embodiment of the present disclosure.

In an implementation, the positioning base station determining method provided in the embodiments of the present disclosure is applied to the OTDOA positioning method. As shown in FIG. 6, a specific positioning procedure is as follows.

S601. A terminal device sends a positioning request message to a positioning server, and the positioning server receives the positioning request message. This step is optional.

S602. The positioning server sends indication information to a serving base station of the terminal device.

S603. The serving base station receives and responds to the indication information, obtains information about a candidate base station, and sends the information about a candidate base station to the positioning server.

S604. The positioning server determines, according to the information about a candidate base station, a positioning base station set used for positioning the terminal device, and instructs a base station (1-*n*) in the positioning base station set to send a PRS to the terminal device.

Specifically, the positioning server sends an auxiliary data message to the terminal device, and the auxiliary data message indicates configuration information of the PRS, so that the terminal device receives and measures the downlink reference signal. The PRS configuration information includes but is not limited to one or more pieces of information such as resource mapping (for example, resource element (RE) mapping) information, an initial PRS sequence value, subframe configuration information, base station location coordinates used for positioning, and neighboring cell information.

S605. Each base station in the positioning base station set sends the PRS.

S606. The terminal device measures and records PRSs sent by any two base stations in the positioning base station set, calculates a time difference RSTD of arrival at the terminal device, and reports the RSTD to the positioning server.

S607. The positioning server obtains location coordinates of the terminal device through calculation according to an RSTD measurement value reported by the terminal device.

Specifically, in the OTDOA positioning method, a location of the terminal device is determined by detecting a time difference of arrival at the terminal device for PRSs sent by at least three different base stations. A specific algorithm may be as follows: The terminal device is located on a hyperbola using two base stations as focal points, coordinates of the terminal device are (x, y), location coordinates of a base station i are $(x_i, y_i)$, a time for sending a signal by the base station i is $T_i$, and a time for receiving the PRS by the terminal device is $t_i$. At least two hyperbolic equations are established, and an intersecting point of two hyperbolic lines is two-dimensional location coordinates of the terminal device. The two-dimensional geographic coordinates of the terminal device may be obtained by solving the equations.

Figure 7:
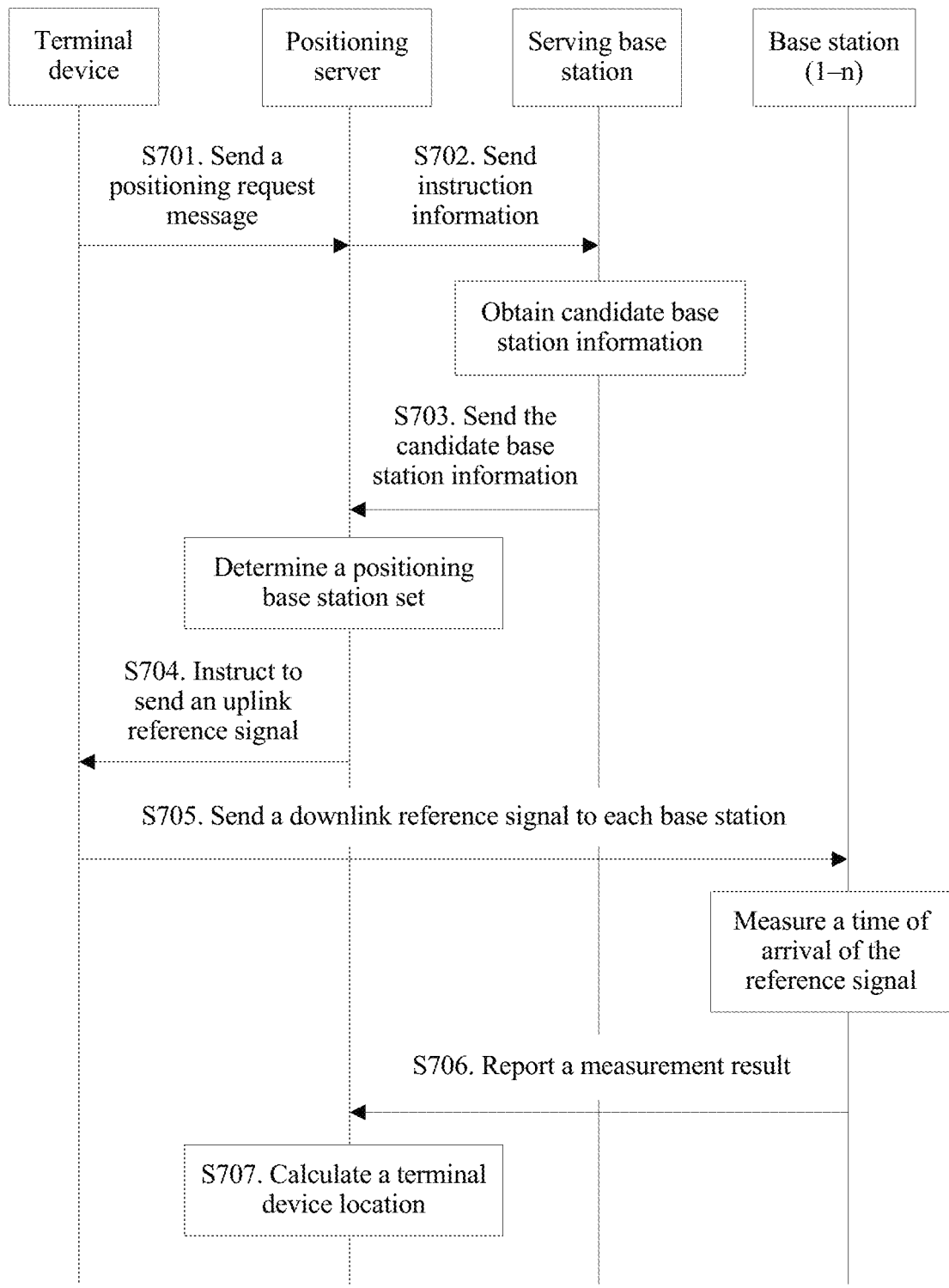
FIG. 7 is a schematic diagram of a positioning procedure of a U-TDOA positioning method according to an embodiment of the present disclosure.

In another implementation, the positioning base station determining method provided in the embodiments of the present disclosure is applied to the U-TDOA positioning method. As shown in FIG. 7, a specific positioning procedure is as follows.

S701. A terminal device sends a positioning request message to a positioning server, and the positioning server receives the positioning request message. This step is optional.

S702. The positioning server sends indication information to a serving base station of the terminal device.

S703. The serving base station receives and responds to the indication information, obtains information about a candidate base station, and sends the information about a candidate base station to the positioning server.

S704. The positioning server determines, according to the information about a candidate base station, a positioning base station set used for positioning the terminal device, and instructs the terminal device to send an SRS to a base station in the positioning base station set.

Specifically, the positioning server sends an auxiliary data message to each base station in the positioning base station set, and the auxiliary data message indicates configuration information of the SRS, so that the base station receives and measures the uplink reference signal. The SRS configuration information includes but is not limited to resource mapping (for example, RE mapping) information, an initial SRS sequence value, and subframe configuration information.

S705. The terminal device sends the SRS to each base station (1-$n$) in the positioning set.

S706. Each base station measures and records a time of arrival of the SRS, and reports the time of arrival to the positioning server.

S707. The positioning server receives the times of arrival, calculates a time difference RSTD of arrival for SRSs of every two base stations, and obtains location coordinates of the terminal device through calculation.

Specifically, for a specific algorithm for calculating the location of the terminal device in the U-TDOA positioning method, refer to the location calculation algorithm in the foregoing OTDOA positioning method. Details are not described herein again.

In the foregoing U-TDOA/OTDOA positioning method, the positioning server directly obtains the information about a candidate base station from the serving base station, and determines the positioning base station set used for positioning, thereby reducing a positioning time, and improving positioning efficiency.

It should be noted that the OTDOA and the U-TDOA are two common terminal device positioning methods. There are a plurality of other types of positioning methods in the prior art, and more different types of positioning methods may exist in the future. The OTDOA/U-TDOA is used only as an example in the present disclosure to record the terminal device positioning method using the positioning base station determining method provided in the embodiments of the present disclosure, but the protection scope of the present disclosure is not limited thereto. The embodiments of the present disclosure provide the positioning base station determining method, and the positioning server, the serving base station, and the network system that support the foregoing positioning base station determining method. Regardless of a type of the terminal device positioning method, application of the positioning base station determining method provided in the embodiments of the present disclosure to a corresponding positioning method, and function support provided by the positioning server, the serving base station, and the network system for the positioning base station determining method are within the protection scope of the present disclosure.

It can be understood that FIG. 3 to FIG. 5 show only simplified designs of a positioning server and a serving base station. In actual application, the positioning server and the serving base station each may include any quantity of transmitters, receivers, processors, controllers, memories, communications units, and the like. For a server and a base station, functions of the transmitter, the receiver, and the processor are not merely limited to functions of cooperatively performing a positioning base station determining method procedure provided in the embodiments of the present disclosure, and may be further used for cooperatively performing another function, for example, a basic communications function and execution of various applications. Details are not described herein. All positioning servers and base stations that can implement the technical solutions of the present disclosure are within the protection scope of the present disclosure.

A person of ordinary skill in the art may be aware that, in combination with the positioning server and various base stations described in the embodiments disclosed in this specification, functions may be implemented by using electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

The processor in the embodiments of the present disclosure may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor.

Method steps described in combination with the content disclosed in the present disclosure may be implemented by hardware, or may be implemented by a processor executing a software instruction. The software instruction may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the application-specific integrated circuit (ASIC). In addition, the ASIC may be located in a terminal device. Certainly, the processor and the storage medium may exist in the terminal device as discrete components.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

It should be understood that "an embodiment", "one embodiment", or "this embodiment of the present disclosure" mentioned in the whole specification means that particular features, structures, or characteristics related to the embodiment are included in at least one embodiment of the present disclosure. Therefore, "in an embodiment", "in one embodiment", or "in this embodiment of the present disclosure" appearing throughout the specification does not refer to a same embodiment. In addition, these particular features, structures, or characteristics may be combined in one or more embodiments by using any appropriate manner.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A method, comprising:
receiving, by a positioning server, a positioning request message, wherein the positioning request message comprises identification information of a serving base station of a terminal device;
sending, by the positioning server, indication information to the serving base station according to the positioning request message;
receiving, by the positioning server from the serving base station, information about a candidate base station, wherein the information about the candidate base station indicates at least one candidate base station; and
determining, by the positioning server, a positioning base station set according to the information about the candidate base station, wherein the positioning base station set comprises a positioning base station configured to position the terminal device, and the positioning base station comprises a first base station of the at least one candidate base station or the serving base station.

2. The method according to claim 1, wherein:
the identification information comprises an identifier of the serving base station; and
sending, by the positioning server, the indication information to the serving base station according to the positioning request message comprises:
sending, by the positioning server, the indication information to the serving base station according to the identifier of the serving base station.

3. The method according to claim 1, wherein the indication information comprises an identifier of the terminal device.

4. The method according to claim 1, wherein:
the information about the candidate base station comprises a respective identifier of each base station of the at least one candidate base station; and
determining, by the positioning server, the positioning base station set according to the information about the candidate base station comprises:
determining, by the positioning server, the positioning base station set according to the respective identifier of each base station of the at least one candidate base station.

5. The method according to claim 4, wherein:
the information about the candidate base station further comprises respective status information of each base station of the at least one candidate base station; and
determining, by the positioning server, the positioning base station set according to the information about the candidate base station comprises:
determining, by the positioning server, the positioning base station set according to the respective identifier and the respective status information of each base station of the at least one candidate base station.

6. The method according to claim 1, wherein:
the information about the candidate base station comprises a respective identifier of each neighboring cell of at least one neighboring cell; and
determining, by the positioning server, the positioning base station set according to the information about the candidate base station comprises:
determining, by the positioning server, the positioning base station set according to the respective identifier of each neighboring cell of the at least one neighboring cell.

7. An apparatus, comprising:
one or more processors; and
a non-transitory memory, wherein the memory is configured to store a computer program, and the one or more processors are configured to execute the computer program stored in the memory to:

receive a positioning request message from a terminal device, wherein the positioning request message comprises identification information of a serving base station of a terminal device;

send indication information to the serving base station according to the Positioning request message; and after sending the indication information to the serving base station, receive information about a candidate base station from the serving base station, wherein the information about the candidate base station indicates at least one candidate base station; and determine a positioning base station set according to the information about the candidate base station;

wherein the positioning base station set comprises a positioning base station configured to position the terminal device, and the positioning base station comprises a first base station of the at least one candidate base station or the serving base station.

8. The apparatus according to claim 7, wherein:
the identification information comprises an identifier of the serving base station of the terminal device; and
the one or more processors being configured to execute the computer program stored in the memory to send the indication information to the serving base station according to the positioning request message comprises the one or more processors being configured to execute the computer program stored in the memory to send the indication information to the serving base station according to the identifier of the serving base station.

9. The apparatus according to claim 7, wherein the indication information comprises an identifier of the terminal device.

10. The apparatus according to claim 7, wherein:
the information about the candidate base station comprises a respective identifier of each base station of the at least one candidate base station; and
the one or more processors being configured to execute the computer program stored in the memory to determine the positioning base station set according to the information about the candidate base station comprises the one or more processors being configured to execute the computer program stored in the memory to determine the positioning base station set according to the respective identifier of each base station of the at least one candidate base station.

11. The apparatus according to claim 10, wherein:
the information about the candidate base station further comprises respective status information of each base station of the at least one candidate base station; and
the one or more processors being configured to execute the computer program stored in the memory to determine the positioning base station set according to the information about the candidate base station comprises the one or more processors being configured to execute the computer program stored in the memory to determine the positioning base station set according to the respective identifier and the respective status information of each base station of the at least one candidate base station.

12. The apparatus according to claim 7, wherein:
the information about the candidate base station comprises a respective identifier of each neighboring cell of at least one neighboring cell; and
the one or more processors being configured to execute the computer program stored in the memory to determine the positioning base station set according to the information about the candidate base station comprises the one or more processors being configured to execute the computer program stored in the memory to determine the positioning base station set according to the respective identifier of each neighboring cell of the at least one neighboring cell.

13. A non-transitory computer readable medium storing program codes for use by a positioning server for transmitting uplink control information (UCI), wherein the program codes comprise instructions for:

receiving a positioning request message, wherein the positioning request message comprises identification information of a serving base station of a terminal device;

sending indication information to the serving base station according to the positioning request message;

receiving information about a candidate base station from the serving base station, wherein the information about the candidate base station indicates at least one candidate base station; and determining a positioning base station set according to the information about the candidate base station, wherein the positioning base station set comprises a positioning base station configured to position the terminal device, and the positioning base station comprises a first base station of the at least one candidate base station or the serving base station.

14. The non-transitory computer readable medium according to claim 13, wherein:
the identification information comprises an identifier of the serving base station; and
sending, by the positioning server, the indication information to the serving base station according to the positioning request message comprises:
sending, by the positioning server, the indication information to the serving base station according to the identifier of the serving base station.

15. The non-transitory computer readable medium according to claim 13, wherein the indication information comprises an identifier of the terminal device.

16. The non-transitory computer readable medium according to claim 13, wherein:
the information about the candidate base station comprises a respective identifier of each base station of the at least one candidate base station; and
determining, by the positioning server, the positioning base station set according to the information about the candidate base station comprises:
determining, by the positioning server, the positioning base station set according to the respective identifier of each base station of the at least one candidate base station.

17. The non-transitory computer readable medium according to claim 13, wherein:
the information about the candidate base station further comprises respective status information of each base station of the at least one candidate base station; and
determining, by the positioning server, the positioning base station set according to the information about the candidate base station comprises:
determining, by the positioning server, the positioning base station set according to the respective identifier and the respective status information of each base station of the at least one candidate base station.

18. The non-transitory computer readable medium according to claim 13, wherein:

the information about the candidate base station comprises a respective identifier of each neighboring cell of at least one neighboring cell; and determining, by the positioning server, the positioning base station set according to the information about the candidate base station comprises:

determining, by the positioning server, the positioning base station set according to the respective identifier of each neighboring cell of the at least one neighboring cell.

* * * * *

UNITED STATES PATENT AND TRADEMARK OFFICE
CERTIFICATE OF CORRECTION

PATENT NO. : 10,588,109 B2  
APPLICATION NO. : 16/227900  
DATED : March 10, 2020  
INVENTOR(S) : Xue et al.

Page 1 of 1

It is certified that error appears in the above-identified patent and that said Letters Patent is hereby corrected as shown below:

In the Claims

In Column 25, Line 6, Claim 7, delete "Positioning" and insert --positioning--.

Signed and Sealed this
First Day of September, 2020

Andrei Iancu
*Director of the United States Patent and Trademark Office*